Nov. 11, 1969 G. R. DUNCAN ET AL 3,478,273
TIME SLOT GENERATOR
Filed Feb. 1, 1966 2 Sheets-Sheet 1
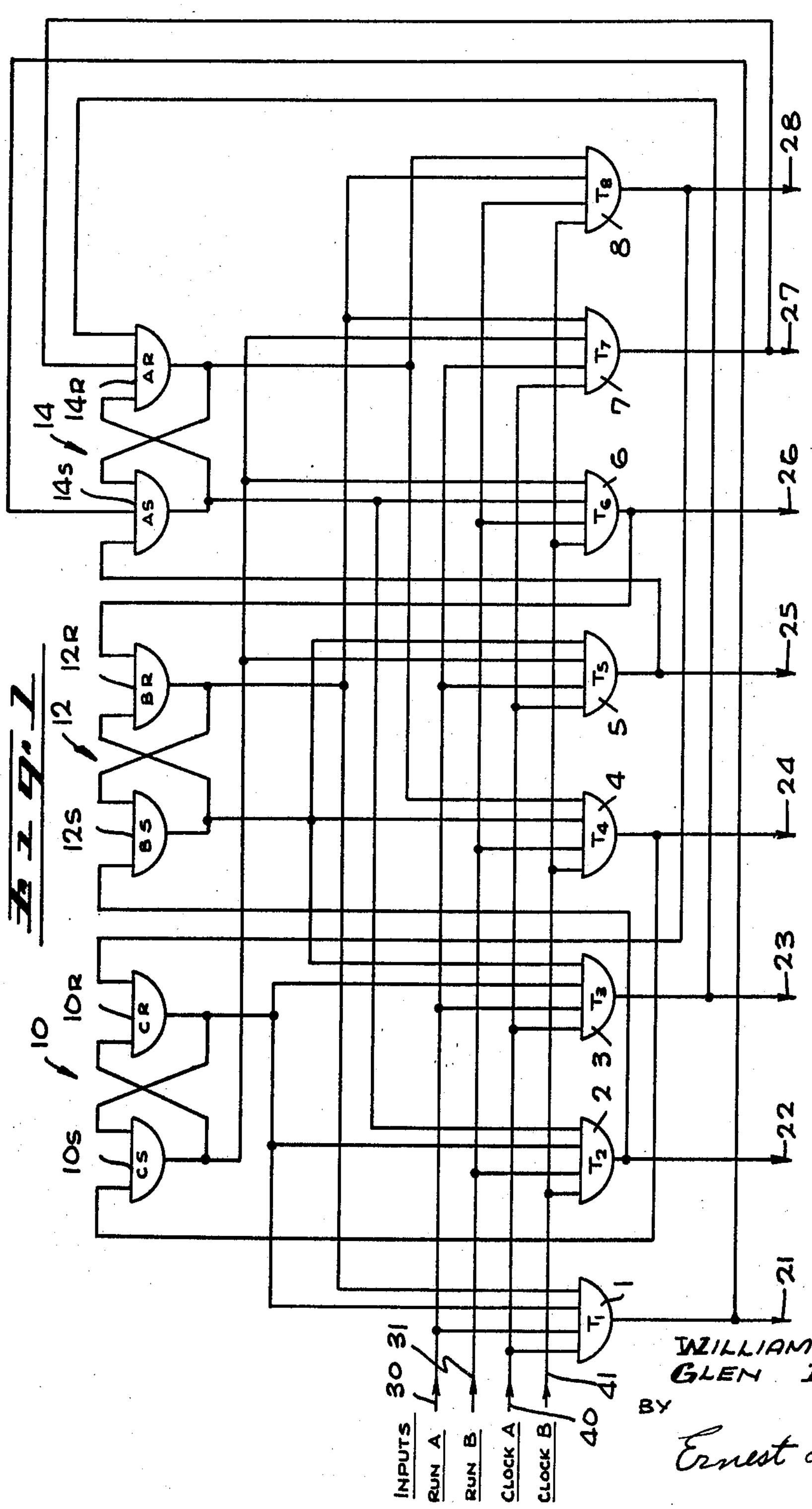
FIG. 1
FIG. 2
| RUN A | RUN B | MODE |
|---|---|---|
| 1 | 1 | RUN |
| 0 | 1 | STOP ON NEXT EVEN TIME SLOT |
| 1 | 0 | STOP ON NEXT ODD TIME SLOT |
| 0 | 0 | STOP |
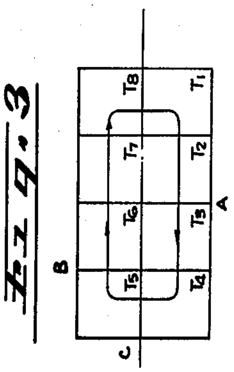
FIG. 3
INVENTORS
WILLIAM H. WERTZ
GLEN R. DUNCAN
BY
Ernest L. Brown
ATTORNEY

| CLOCK | | FLIP FLOP | | | TIME | SEQUENCE |
|---|---|---|---|---|---|---|
| A | B | C | B | A | SLOT | ACTION |
| 1 | 0 | 0 | 0 | 0 | $T_1$ | SET A |
| 0 | 1 | 0 | 0 | 1 | $T_2$ | SET B |
| 1 | 0 | 0 | 1 | 1 | $T_3$ | RESET A |
| 0 | 1 | 0 | 1 | 0 | $T_4$ | SET C |
| 1 | 0 | 1 | 1 | 0 | $T_5$ | SET A |
| 0 | 1 | 1 | 1 | 1 | $T_6$ | RESET B |
| 1 | 0 | 1 | 0 | 1 | $T_7$ | RESET A |
| 0 | 1 | 1 | 0 | 0 | $T_8$ | RESET C |

INVENTORS
WILLIAM H. WERTZ
GLEN R. DUNCAN
BY
Ernest L. Brown
ATTORNEY

United States Patent Office 3,478,273
Patented Nov. 11, 1969

3,478,273
TIME SLOT GENERATOR

Glen R. Duncan and William H. Wertz, Canoga Park, Los Angeles, Calif., assignors to Litton Systems, Inc., Beverly Hills, Calif., a corporation of Maryland Filed Feb. 1, 1966, Ser. No. 524,269
Int. Cl. H03k 3/04
U.S. Cl. 328—63 11 Claims

ABSTRACT OF THE DISCLOSURE

A time slot generator comprising N flip-flops and $2^N$ inverting gates interconnected such that the inverting gates sequentially provide $2^N$ distinct output pulses, while the combination of states of the flip-flops sequence in accordance with a unit distance code. A pair of clock signal input circuits, connectable to a two phase clock, are coupled to selected ones of said plurality of inverting gates; thereby to apply in operation clock signals for controlling the stepping of the inverting gates. Further two, separate, control signal input terminals, connectable to a source of control signals, are coupled to the inverting gates so that, in operation, the control signals allow the gates selectively to free run, to step one step at a time, or to stop.

This invention pertains to a time slot generator adapted to perform the central timing for a digital computer.

The generator of this invention is adapted with a minimum of parts to produce a multiphase, substantially rectangular shaped, signal from a two-phase clock signal.

In a preferred embodiment of the invention, economy of parts is achieved by using inverting gates.

It is therefore an object of this invention to provide a time slot generator using a plurality of gates, feeding by and feeding back to a lesser number of flip-flops.

It is another object of this invention to provide a novel time slot generator.

It is still another object of this invention to provide a multiphase output signal from a device which is driven by a two-phase clock signal.

Other objects will become apparent from the following description, taken in connection with the accompanying drawings in which:

FIGURE 1 is a circuit diagram of a typical device in accordance with this invention;

FIGURE 3 is a Vietch diagram showing the state sequence of the device of FIGURE 1;

FIGURE 4 is a schedule of the control signals used in the device of FIGURE 1.

Figures 2, 5:
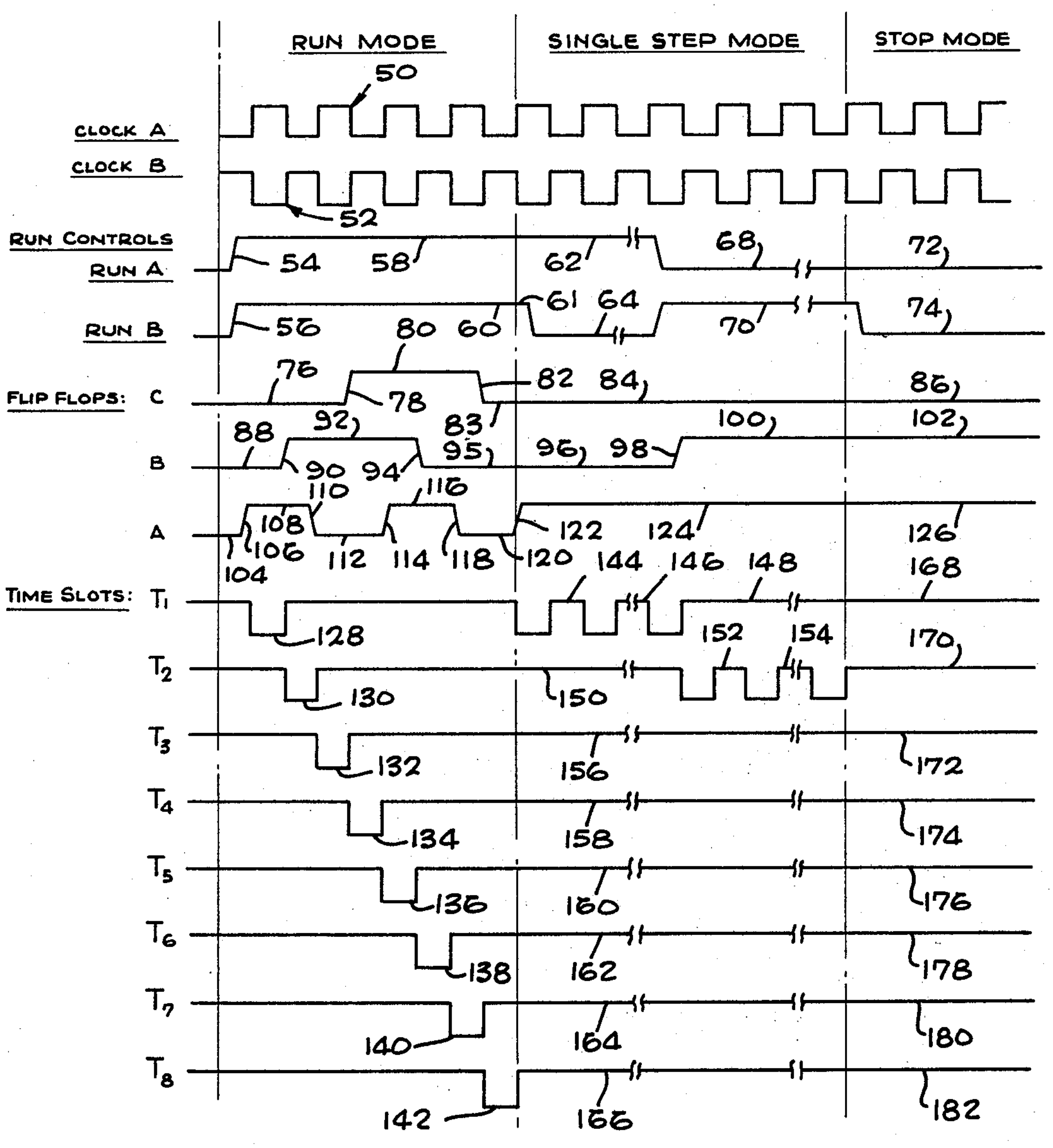
FIGURE 2 is a schedule showing the sequence of actions during operation of the device of FIGURE 1.
FIGURE 5 is a graph of typical waveforms found in the device of FIGURE 1.

In FIGURE 1, a plurality of inverting gates 1, 2, 3, 4, 5, 6, 7 and 8 are connected to be controlled by the output signals of flip-flops 10, 12 and 14. The flip-flops 10, 12 and 14 each use a pair of interconnected inverting gates: flip-flop 10 uses inverting gates 10S and 10R, flip-flop 12 uses inverting gates 12S and 12R, and flip-flop 14 uses inverting gates 14S and 14R.

An inverting gate is defined as a logical binary device whose single output has two states (referred to here as states X and X prime) and is a combinatorial function of the state of its several inputs, such as, if, and only if, all of the inputs to the gate are in the state X, the output will be caused to be in the state X prime; conversely stated, the output of the gate is caused to be in the state X if, and only if, any of its several inputs are in the state X prime.

The output terminals of inverting gates 1 through 8 are shown at 21 through 28. A pair of control terminals are shown at 30 and 31. A two-phase clock (not shown) is connected by one phase to terminal 40 and by the other phase to terminal 41.

Inverting gate 1 has its input terminals connected to terminals 30 and 40 and to the output terminals of gates 10R and 12R.

Inverting gate 2 has its input terminals connected to terminals 31 and 41 and to the output terminals of gates 10R and 14S.

Inverting gate 3 has its input terminals connected to terminals 30 and 40 and to the output terminals of gates 10R and 12S.

Inverting gates 4 has its input terminals connected to terminals 31 and 41 and to the output terminals of gates 12S and 14R.

Inverting gate 5 has its input terminals connected to terminals 30 and 40 and to the output terminals of gates 10S and 12S.

The input terminals of gate 6 are connected to terminals 31 and 41 and to the output terminals of gates 10S and 14S.

The input terminals of gate 7 are connected to terminals 30 and 40 and to the output terminals of gates 10S and 12R.

The input terminals of inverting gate 8 are connected to terminals 31 and 41 and the output terminals of gates 12R and 14R.

The input terminals of gate 10S are connected to the output terminals of gates 10R and 4.

The input terminals of gate 10R are connected to output terminals of gates 10S and 8.

The input terminals of gate 12S are connected to the output terminals of gates 12R and 2.

The input terminals of gate 12R are connected to output terminals of gates 12S and 6.

The input terminals of gate 14S are connected to the output terminals of gates 14R, 1, and 5.

The input terminals of gate 14R are connected to output terminals of gates 14S, 7, and 3.

Flip-flops 10, 12 and 14 form a flip-flop register having a single rank of storage. The flip-flop register is adapted to index or step in accordance with a unit distance code. The gates forming the flip-flops of the flip-flop register are inverting gates of the same type as the gates 1 through 8, i.e. NAND gates or NOR gates.

Typically, when a flip-flop—for example flip-flop 10—is set so that the output terminal of gate 10S is at a high voltage while the output terminal of gate 10R is at a low voltage, the flip-flop 10 may be said to be in a "1 state." When the output terminal of gate 10R is at a high voltage while the output terminal of gate 10S is at a low voltage, the flip-flop may be said to be in a "zero state." These designations are by agreement only and may be interchanged.

With the connections shown, when a signal is applied to both terminals 30 and 31, the flip-flops 10, 12 and 14 step through a sequence having a unit distance code. A unique one of the terminals 21 through 28 has a signal thereon for each unique combination of output signals of the flip-flop register. Thus, the signals step in time sequence with the clock signal on terminals 40 and 41, from 21 to 22, to 23, to 24, to 25, to 26, to 27, to 28, and back to 21.

With only a signal on terminal 30, the output signals stop at the next odd numbered time slot, e.g. if the signal is on 22, it advances to 23, if it is on 21 it does not advance.

If only a signal is on the terminal 31 with no signal on terminal 30, the output signals on terminals 21 through 28 advance to the next even numbered time slot.

With no voltages on terminals 30 and 31, the circuit operation stops. The schedule of operation is shown in FIGURE 4.

A Vietch diagram of the stepping of the output signals on terminals 21 through 28 (designated T1 through T8) is shown in FIGURE 3.

The operation of the device of this invention may best be described in connection with the schedule of FIGURE 2 and the waveforms of FIGURE 5. The wave train of the two phases of a two-phase clock are shown at 50 and 52. In the run mode, signals are applied to terminals 30 and 31, as shown at 54 and 56 and at 58 and 60. The flip-flops C, B, and A are, respectively flip-flop 10, 12 and 14. Initially flip-flops 10, 12 and 14 are in their zero state, i.e. the outputs of gates 10S, 12S and 14S are low while the outputs of gate 10R, 12R and 14R are high. Because gates 10R and 12R have high outputs, and because there is a high output on terminal 30, the occurrence of a high output on terminal 40 causes inverting gate 1 to generate a low output at terminal 21. The signal at terminal 21 is shown at 128.

The dropping of the signal at 21 causes the signal at the output of gate 14S to be changed to a high value, as shown at 104, 106 and 108. Because the voltage on terminal 23 and the voltage on terminal 27 are both high, the increasing of the voltage at the output terminal of gate 14S causes the voltage at the output of terminal of gate 14R to change to its low value.

With high voltages at the output terminals of gates 10R and 14S, and with a high voltage of terminal 31, the occurrence of a high voltage on terminal 41 causes the voltage at 22 to drop to a low value. The dropping of the voltage on terminal 40 to a low value causes the voltage at 21 to increase to a high value. The increasing of the voltage at 21 to a high value does not reset flip-flop 14 because of the presence of a low voltage at the output of gate 14R.

The drop in voltage at terminal 22 causes an increase in voltage at the output of terminal of gate 12S which, in turn, causes the voltage at the output terminal of gate 12R to change to its low value.

The presence of a voltage on terminal 31 in combination with the presence of voltages at the output terminals of gates 10R and 12S causes the voltage at terminal 23 to drop upon the appearance of the next high clock pulse at terminal 40. The dropping of the pulse on terminal 41 to a low value causes the voltage at 22 to increase to a high value. The voltage at the output terminal 23 is then shown at 132.

In a similar fashion, with each clock pulse at terminals 40 and 41, the presence of a low voltage transfers consecutive from terminal 21 to 22, to 23, to 24, to 25, to 26, to 27, to 38 and back to 21.

The flip-flops 10, 12 and 14 are reset or set, as described in FIGURE 2, at consecutive low signals on terminals 21 through 28.

With flip-flops 10, 12 and 14 set to a zero state, the occurrence of a high state on terminal 40 causes a low state to exist on terminal 21 which sets flip-flop 14.

With flip-flops 10 and 12 in their zero state and flip-flop 14 in its "1 state," the occurrence of a high voltage on terminal 41 causes a low voltage to appear at terminal 22 which causes flip-flop 12 to be set to its "1 state." With flip-flop 10 in its zero state and flip-flops 12 and 14 in their "1 state," the rising of the voltage in terminal 40 to a high value causes a low value to appear at terminal 23 which causes flip-flop 14 to be reset to its zero state.

With flip-flop 10 and 14 in their zero state and flip-flop 12 in its "1 state," the occurrence of a high voltage at terminal 41 causes a low voltage to appear at terminal 24. The appearance of a low voltage at terminal 24 causes flip-flop 10 to be set to its "1 state."

With flip-flops 10 and 12 in their one state and flip-flop 14 in its zero state, the appearance of a high voltage at terminal 40 causes a low voltage to appear at terminal 25. The appearance of a low voltage at terminal 25 causes flip-flop 14 to be set to its one state.

With flip-flops 10, 12 and 14 in their one state, the appearance of high voltage at terminal 41 causes a low voltage to appear at terminal 26. The appearance of a low voltage at terminal 26 causes flip-flop 12 to be reset to its zero state.

With flip-flops 10 and 14 set to their one state and flip-flop 12 set to its zero state, the appearance of a high voltage on terminal 40 causes a low voltage to appear on terminal 27. The appearance of a low voltage on terminal 27 causes flip-flop 14 to be reset to its zero state.

With flip-flop 10 set to its one state and flip-flops 12 and 14 set to their zero state, the appearance of a high voltage on terminal 41 causes a low voltage to appear on terminal 28. The appearance of a low voltage on terminal 28 causes flip-flop 10 to be reset to its zero state. The cycle then repeats.

The setting and resetting of flip-flop 10 is shown at 76, 78, 80, 82 and 83. The setting and resetting of flip-flop 12 is shown at 88, 90, 92, 94 and 95. The setting of flip-flop 14 is shown at 104, 106, 108, 110, 112, 114, 116 and 118. The output signals on terminals 21 through 28 is shown at 128 through 142.

It is to be noted that the changes in the states of the flip-flops from one output condition to the next succeeding output condition require only the setting or resetting of one flip-flop. This is called a unit distance code.

Other unit distance code combinations could have been used. For example, if only six output terminals had been desired, instead of eight, the flip-flops could have been programmed to cause output signals to appear in the sequence, e.g., T1, T2, T3, T6, T7 and T8. Under those circumstances, the sequence action for the flip-flops would have been:

Set A
Set B
Set C
Reset B
Reset A
Reset C

If the sequence, e.g. T2, T3, T4, T5, T6, T7 were desired, the sequence action for the flip-flops would have been:

(with flip-flop A initially in its one state)
Set B
Reset A
Set C
Set A
Reset B
Reset C If it were desired to use only four output terminals, only two flip-flops would need to be used. However, with the three flip-flops, if the sequence T1, T2, T7, T8 were desired, the sequence action for the flip-flops would be:

Set A
Set C
Reset A
Reset C

For the sequence T2, T3, T6, T7 (with flip-flop A initially in its one state), the sequence action for the flip-flops would be:

Set B
Set C
Reset B
Reset C

For the sequence T3, T4, T5, T6 (with flip-flops A and B initially in their one state), the sequence action for the flip-flops would be:

Reset A
Set C
Set A
Reset C

It is to be noted that any even number of output signals can be produced, the maximum number depending upon the number of flip-flops used, i.e.

| No. of flip-flops used: | Maximum number of output signals |
|---|---|
| 2 | 4 |
| 3 | 8 |
| 4 | 16 |
| 5 | 32 |

etc.

Thus, the device of this invention is adapted to be controlled to provide timing signals for a computer.

Although the device of this invention has been described in detail above, it is not intended that the description should be all inclusive, but that the invention should be limited only by the spirit and scope of the appended claims.

What is claimed is:

1. A timing signal generator for producing a time sequence of separate, distinct output signals, said generator comprising:
   - a number of flip-flops;
   - a plurality of inverting gates not exceeding the number of combinations of states of the flip-flops, said inverting gates interconnected with said flip-flops so that each of the inverting gates produces a distinct output signal during a different unique one of the combinations of states of the flip-flops; the output signals of the inverting gates being effective to set and reset the flip-flops in accordance with a unit distance code; and
   - a pair of clock signal inputs circuits connectable to a two-phase clock, thereby to apply, in operation, the phases of the clock to control respective halves of the plurality of the inverting gates.

2. A device as recited in claim 1 and further comprising a pair of control inputs terminals connectable to a source of first and second control signals, thereby to apply, in operation the first and second control signals to respective halves of the plurality of inverting gates to control the free running sequencing of said gates and said flip-flops.

3. A device as recited in claim 1 in which each flip-flop comprises a pair of inter-connecting inverting gates.

4. A device as recited in claim 3 in which said flip-flops are single rank flip-flops.

5. A time slot generator for generating timing signals in a time sequence of separate, distinct output pulses, the generator comprising:
   - a plurality of inverting gates with each gate adapted to produce a distinct one of the sequence of output pulses;
   - a register of flip-flops directly interconnected with each of said plurality of inverting gates such that said flip-flops are controlled in accordance with a unit distance code;
   - the output signals of said inverting gates being effective to set and reset the flip-flops of said register in accordance with said unit distance code;
   - selected ones of the output signals of said register being applied to each of said inverting gates to cause said inverting gates to step their output signals; and
   - a pair of clock signal input circuits connectable to a two phase clock, and coupled to said plurality of inverting gates for controlling the stepping sequence of said said inverting gates.

6. A device as recited in claim 5 and further comprising two separate control signal input terminals connectable to a source of control signals, for controlling the stepping of said inverting gates to allow said gates selectively to free run, to step one step at a time, and to stop.

7. A time slot generator for the generation of controlled timing signals producing a time sequence of a number of separate, distinct output pulses, the generator comprising:
   - a number of inverting gates;
   - a register of flip-flops interconnected with said number of inverting gates, the arrangement being such that each of the inverting gates produces a distinct output signal during a distinct combination of states of the flip-flops, the output signals from the inverting gates being effective to set and reset the flip-flops in accordance with a unit distance code;
   - a pair of clock signal input terminals connectable to a two phase clock, thereby to apply, in operation, the phases of the clock to control respective halves of the number of the inverting gates; and
   - first and second control signal input terminals, each said control signal input terminals being connectable to a control signal source in such a manner that each of the control signals controls respective halves of the number of inverting gates to control the free running sequencing of said generator.

8. A device as recited in claim 7 in which each flip-flop of said register comprises a pair of inter-connecting inverting gates.

9. A device as recited in claim 8 in which said inverting gates are NOR gates.

10. A device as recited in claim 8 in which said inverting gates are NAND gates.

11. The device of claim 7 comprising:
   - three flip-flops in the register and eight inverting gates, with one of the clock signal input terminals being connected to a first one of the input terminals of the first, third, fifth and seventh gates and the other of the clock signals input terminals being connected to a first one of the input terminals of the second, fourth, sixth and eighth gates, the first control signal input terminal being connected to a second one of the input terminals of the first, third, fifth and seventh gates and the second control signal input terminal being connected to a second one of the input terminals of the second, fourth, sixth and eighth gates;
   - third and fourth input terminals of the first gate being connected to the reset output terminal of the third flip-flop and the reset output terminal of the second flip-flop, respectively;
   - third and fourth input terminals of the second gate being connected to the reset output terminal of the third flip-flop and the set output terminal of the first flip-flop, respectively;
   - third and fourth input terminals of the third gate being connected to the reset output terminal of the third flip-flop and set output terminal of the second flip-flop, respectively;
   - third and fourth input terminals to the fourth gate being connected to the set output terminal of the second flip-flop and the reset output terminal of the first flip-flop, respectively;
   - third and fourth input terminals of the fifth gate being connected to the set output terminal of the third flip-flop and the set output terminal of the second flip-flop, respectively;
   - third and fourth input terminals of the sixth gate being connected to the set output terminal of the first flop-flop and the set output terminal of the third flip-flop, respectively;
   - third and fourth input terminals of the seventh gate being connected to the set output terminal of the third flip-flop and the reset output terminal of the second flip-flop respectively;
   - third and fourth input terminals of the eighth gate being connected to the reset output terminal of the second flip-flop and the reset output terminal of the first flip-flop, respectively;
   - the set input terminals of the first flip-flop being connected to the reset output terminal of the first flip-flop and the output terminals of the first and the fifth gates;

the reset input terminals of the first flop-flop being connected to the set output terminal of the first flip-flop and the output terminals of the third and seventh gates;

the set input terminals of the second flip-flop being connected to the reset output terminal of the second flip-flop and the output terminal of the second gate;

the reset input terminals of the second flip-flop being connected to the set output terminal of the second flip-flop and the output terminal of the sixth gate;

the set input terminals of the third flip-flop being connected to the reset output terminal of the third flip-flop and the output terminal of the fourth gate; and the reset input terminals of the third flip-flop being connected to the set output terminal of the third flip-flop and the output terminal of the eighth gate.

References Cited

UNITED STATES PATENTS

| | | | |
|---|---|---|---|
| 3,162,815 | 12/1964 | Mogensen | 328—62 |
| 3,168,700 | 2/1965 | Gesek et al. | 328—62 |
| 3,268,820 | 8/1966 | Newman et al. | 328—62 |
| 3,268,821 | 8/1966 | Wang | 328—63 |
| 3,327,225 | 6/1967 | Schell | 328—62 |
| 3,162,816 | 12/1964 | Rakoczi et al. | 307—269 X |
| 3,268,820 | 8/1966 | Newman et al. | 307—269 X |
| 3,290,606 | 12/1966 | Rodner | 307—269 X |
| 3,325,741 | 6/1967 | Arya | 307—269 X |

MAYNARD R. WILBUR, Primary Examiner

CHARLES D. MILLER, Assistant Examiner

U.S. Cl. X.R.

307—269; 328—48, 62